United States Patent
Baillon et al.

(10) Patent No.: US 8,077,055 B2
(45) Date of Patent: Dec. 13, 2011

(54) METHOD AND DEVICE FOR FILTERING WINDSHEARS ALARMS FOR AN AIRCRAFT

(75) Inventors: Bertrand Baillon, Pins Justaret (FR); Stéphane Fleury, Colomiers (FR); Laurence Mutuel, Tournefeuille (FR)

(73) Assignee: Thales (FR)

( * ) Notice: Subject to any disclaimer, the term of this patent is extended or adjusted under 35 U.S.C. 154(b) by 542 days.

(21) Appl. No.: 12/354,098

(22) Filed: Jan. 15, 2009

(65) Prior Publication Data

US 2009/0184846 A1 Jul. 23, 2009

(30) Foreign Application Priority Data

Jan. 23, 2008 (FR) ...................................... 08 00351

(51) Int. Cl.
*G08B 23/00* (2006.01)
(52) U.S. Cl. ........ 340/968; 340/963; 340/945; 340/949; 701/5; 701/6; 701/8; 701/9; 701/14
(58) Field of Classification Search .................... 340/968
See application file for complete search history.

(56) References Cited

U.S. PATENT DOCUMENTS

| | | | | |
|---|---|---|---|---|
| 3,839,699 A | * | 10/1974 | Heinsohn et al. | 340/966 |
| 5,053,767 A | * | 10/1991 | Zweifel et al. | 340/968 |
| 5,119,091 A | | 6/1992 | Zweifel | |
| 5,359,888 A | | 11/1994 | Hagen | |
| 5,803,408 A | * | 9/1998 | Gast | 244/178 |
| 7,352,447 B2 | | 4/2008 | Schlotterbeck et al. | |
| 7,423,736 B2 | | 9/2008 | Baillon et al. | |
| 2007/0223004 A1 | | 9/2007 | Baillon et al. | |

FOREIGN PATENT DOCUMENTS

DE 19641232 5/1997

OTHER PUBLICATIONS

Bowles, R. L. Ed—Institute of Electrical and Electronics Engineers, "Windshear Detection and Avoidance: Airborne Systems Survey," Proceedings of the Conference on Decision and Control, Honolulu, Dec. 5-7, 19990; [Proceedings of the Conference on Decision and Control], New York, IEEE, US, vol. 2 of 06, Dec. 5, 1990, pp. 708-736, XP 000200136.

* cited by examiner

*Primary Examiner* — Benjamin C Lee
*Assistant Examiner* — Curtis King
(74) *Attorney, Agent, or Firm* — Lowe Hauptman Ham & Berner, LLP

(57) ABSTRACT

Method, device and item of equipment for filtering alarms originating from a windshear detection system embedded in an aircraft being able to emit an alarm. The aircraft has at least one sensor allowing the acquisition of a flight parameter. The device includes: units for the calculation of the second derivative of the flight parameter, units for the calculation of the absolute value of the second derivative of the flight parameter, units for the comparison of the absolute value of the second derivative of the flight parameter with a threshold C1, units for evaluating whether the absolute value of the second derivative of the flight parameter exceeds the threshold C1 over a duration greater than a time threshold T, and units for suppressing the alarm originating from the windshear detection system.

9 Claims, 4 Drawing Sheets

METHOD AND DEVICE FOR FILTERING WINDSHEARS ALARMS FOR AN AIRCRAFT

RELATED APPLICATIONS

The present application is based on, and claims priority from, French Application Number 08 00351, filed Jan. 23, 2008, the disclosure of which is hereby incorporated by reference herein in its entirety.

FIELD OF THE INVENTION

The invention relates to embedded windshear detection systems and more particularly to reducing the number of false alarms in such systems.

BACKGROUND OF THE INVENTION

Windshears are dangerous phenomena for an aircraft, in particular during the landing and takeoff phases where the margin for maneuver in relation to the terrain is all the smaller the stronger the wind currents. To forestall dramatic changes of speed and altitude, reactive systems for detecting windshear conditions exist. Nevertheless, certain turbulence and gusts that may be encountered by an aircraft in the course of an approach or takeoff phase possess frequencies and/or amplitudes that the reactive windshear detection system might interpret as belonging to the group of windshears and thus leading to the generation of a false alarm.

In the field of aeronautics, reactive embedded windshear detection systems remain sensitive to the atmospheric conditions whose properties are close to those of windshears. In particular, the reactive systems which process the filtered data arising from the airplane sensors are sensitive to gusts and turbulence.

According to the known art, reactive windshear detection systems limit the number of false alarms by spectrally filtering the data arising directly from the sensors: angles of attack, accelerations, roll, yaw and pitch. However, turbulence and gusts exist in a wide range of frequencies and the number of residual false alarms does not satisfy the values expected by the standards and feedback in commercial operations.

The invention is aimed at alleviating the problems cited above by proposing a method and device for filtering alarms originating from a system for detecting windshears. The invention has the advantage of reducing the number of false alarms in the presence of gusts or turbulence. The invention is based on processing the second derivative with respect to time of the angle of attack of the aircraft as well as the second derivative of the estimated severity factor. The invention furthermore makes it possible to analyze in parallel the calculated values of the vertical wind and of the horizontal deceleration or acceleration and to compare them with aircraft-dependent threshold values. Thus, the invention makes it possible to differentiate genuine windshear from a gust or turbulence and consequently to avoid the emission of false alarms.

The invention also has the advantage of being able to operate with any system for detecting windshears. Specifically the invention implements an additional filter compatible with the detection systems according to the known art.

SUMMARY OF THE INVENTION

For this purpose, the subject of the invention is a method for filtering alarms originating from a windshear detection system embedded in an aircraft, the detection system being able to emit an alarm, the aircraft comprising at least one sensor allowing the acquisition of a flight parameter, the method being characterized in that it comprises the following steps:
the calculation of the second derivative of the flight parameter,
the comparison of a term related to the second derivative of the flight parameter with a threshold C1,
the suppression of the alarm if the term is greater than the threshold C1 over a duration greater than a time threshold T, otherwise the alarm is not suppressed.

According to one aspect of the invention, the method furthermore comprises a step of calculating the absolute value of the second derivative of the flight parameter, the term related to the second derivative of the flight parameter being this absolute value.

According to a variant of the invention, the flight parameter is the angle of attack of the aircraft.

According to another variant of the invention, the flight parameter is the severity factor.

The subject of the invention is also a device for filtering alarms originating from a windshear detection system embedded in an aircraft, the detection system being able to emit an alarm, the aircraft comprising at least one sensor allowing the acquisition of a flight parameter, characterized in that the device comprises means for implementing the method according to the invention.

According to an aspect of the invention, the means for implementing the method comprise:
means for the calculation of the second derivative of the flight parameter,
means for the comparison of a term related to the second derivative of the flight parameter with a threshold C1,
means for evaluating whether the term related to the second derivative of the flight parameter exceeds the threshold C1 over a duration greater than a time threshold T,
means for suppressing the alarm originating from the windshear detection system.

According to an aspect of the invention, the means for implementing the method furthermore comprise: means for the calculation of the absolute value of the second derivative of the flight parameter, the term related to the second derivative of the flight parameter being this absolute value.

According to a variant of the invention, the flight parameter is the angle of attack of the aircraft and in that the means for evaluating whether the term related to the second derivative of the flight parameter sporadically exceeds the threshold C1 comprise:
a first pathway comprising a first opening gate being linked to the comparison means and being able to suppress an alarm for a first duration $T_1$ and a first confirmer being able to authorize an output of the alarm for a second duration $T_2$.
a second pathway comprising a second opening gate being linked to the comparison means and being able to suppress an alarm for the first duration $T_1$ and a second confirmer being able to authorize an output of the alarm for the second duration $T_2$, According to another variant of the invention, the flight parameter is the severity factor and in that the means for evaluating whether the term related to the second derivative of the flight parameter sporadically exceeds the threshold C1 comprise:
an opening gate being linked to the comparison means and being able to suppress an alarm for a first duration $T_1$,
a confirmer being able to authorize an output of the alarm for a second duration $T_2$ and being linked to the opening gate.

According to an aspect of the invention, the device furthermore comprises means for filtering the signals corresponding to wind gusts.

According to an aspect of the invention, the means for filtering an alarm corresponding to wind gusts comprise:

- a first AND gate generating the value TRUE when the absolute value datum of the filtered vertical wind A3 is less than a third threshold C3 and when the filtered horizontal acceleration datum A4 is less than a fourth threshold C4 and generating the value FALSE otherwise;
- a second AND gate generating the value TRUE when the absolute value datum of the filtered vertical wind A5 is less than a fifth threshold C5 and when the filtered horizontal acceleration datum A6 is greater than a sixth threshold C6 and generating the value FALSE otherwise;
- a first OR gate generating the value TRUE when the output of the first AND gate or of the second AND gate is TRUE, corresponding to the possible presence of a gust and generating the value FALSE otherwise;
- a first detector generating the value TRUE upon a change of sign of the severity factor datum and generating the value FALSE otherwise;
- a first listening gate being linked to the first detector and generating the value TRUE for a first duration T1 when the first detector has generated the value TRUE and generating the value FALSE otherwise;
- a third AND gate generating the value TRUE when the first listening gate and the first OR gate generate the value TRUE;
- a first suppression gate being activated only when the third AND gate generates the value TRUE;
- a second detector generating the value TRUE upon a change of sign of the severity factor datum and generating the value FALSE otherwise;
- a second listening gate being linked to the second detector and generating the value TRUE for a first duration T3 when the second detector generates the value TRUE and generating the value FALSE;
- a fourth AND gate generating the value TRUE when the second listening gate and the first OR gate generate the value TRUE;
- a second suppression gate being activated only when the fourth AND gate generates the value TRUE;
- a second OR gate generating the value TRUE when at least one of the two suppression gates generates the value TRUE and generating the value false otherwise, a windshear alert being suppressed when the second OR gate generates the value TRUE.

The subject of the invention is also an item of equipment for detecting windshears comprising a system for detecting windshears, the item of equipment being embedded in an aircraft, the detection system being able to emit an alarm, the aircraft comprising at least one sensor allowing the acquisition of a flight parameter, the item of equipment being characterized in that it comprises the device for filtering alarms according to the invention.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious aspects, all without departing from the invention. Accordingly, the drawings and description thereof are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein.

DETAILED DESCRIPTION OF THE INVENTION

Figure 1:
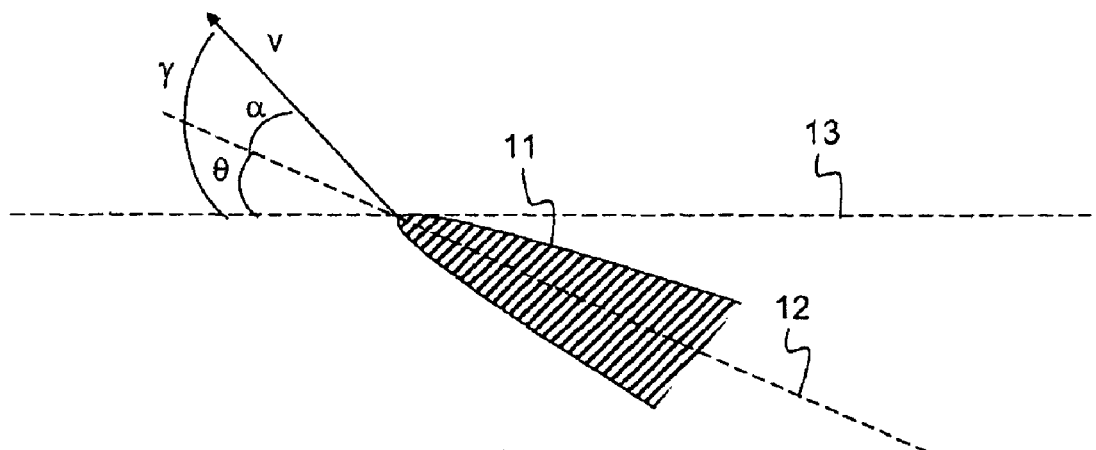
FIG. 1 represents the nose of an aircraft and its longitudinal axis.

FIG. 1 represents the nose of an aircraft 11 and its longitudinal axis 12. The aircraft flies according to a speed vector V. A first angle γ defined between the speed vector V and a horizontal line 13 is called the trajectory angle (or "flight path angle"). A second angle θ between the longitudinal axis 12 and the horizontal line 13 is called the pitch of the aircraft. A third angle α formed between the speed vector V and the longitudinal axis 12 is called angle of attack. The angle of attack is the parameter of the airplane most impacted by changes of air speed.

Figure 2:
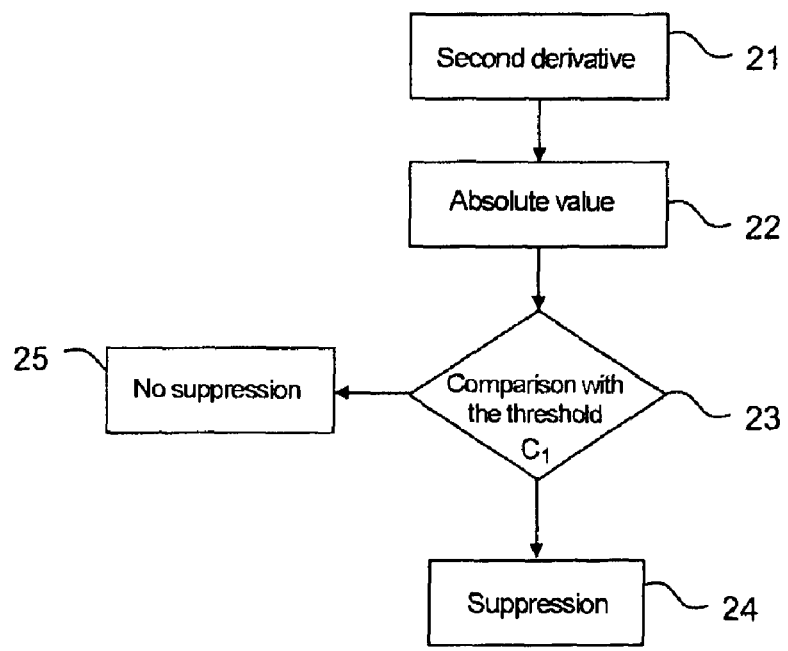
FIG. 2 represents a chart of the method according to the invention.

The invention relates to a method of reducing the number of false alarms in a reactive windshear detection system embedded in an aircraft, the detection system being able to emit an alarm. The aircraft comprises at least one sensor allowing the acquisition of a flight parameter. FIG. 2 represents a chart of the method according to the invention. The method according to the invention comprises the following steps: the calculation of the second derivative with respect to time 21 of the flight parameter; the comparison 23 of a term related to the second derivative of the flight parameter with a threshold C1; the suppression of the alarm 24 if the absolute value of the second derivative of the flight parameter is greater than the threshold C1 over a duration greater than a time threshold T, otherwise the alarm is not suppressed 25.

According to a variant of the invention, the method furthermore comprises a step 22 of calculating the absolute value of the second derivative of the flight parameter, the term related to the second derivative of the flight parameter being this absolute value.

According to an embodiment of the method according to the invention the flight parameter is the angle of attack.

According to another embodiment of the method according to the invention, the flight parameter is the severity factor. The severity factor—or F-factor—is a non-dimensional parameter developed by NASA which quantifies the airplane's loss of energy produced by a windshear. This factor actually represents an equivalence of excess thrust demanded of the airplane so as to maintain its bearing despite the variations of the wind field. The excess thrust is defined as the thrust of the airplane minus its drag, the whole divided by the weight of the airplane, that is to say the thrust force remaining after having compensated for the drag.

The invention also relates to a device for filtering alarms originating from a windshear detection system embedded in an aircraft. The detection system is able to emit an alarm. The aircraft comprises at least one sensor allowing the acquisition of a flight parameter. This device implements the method according to the invention.

Figure 3:
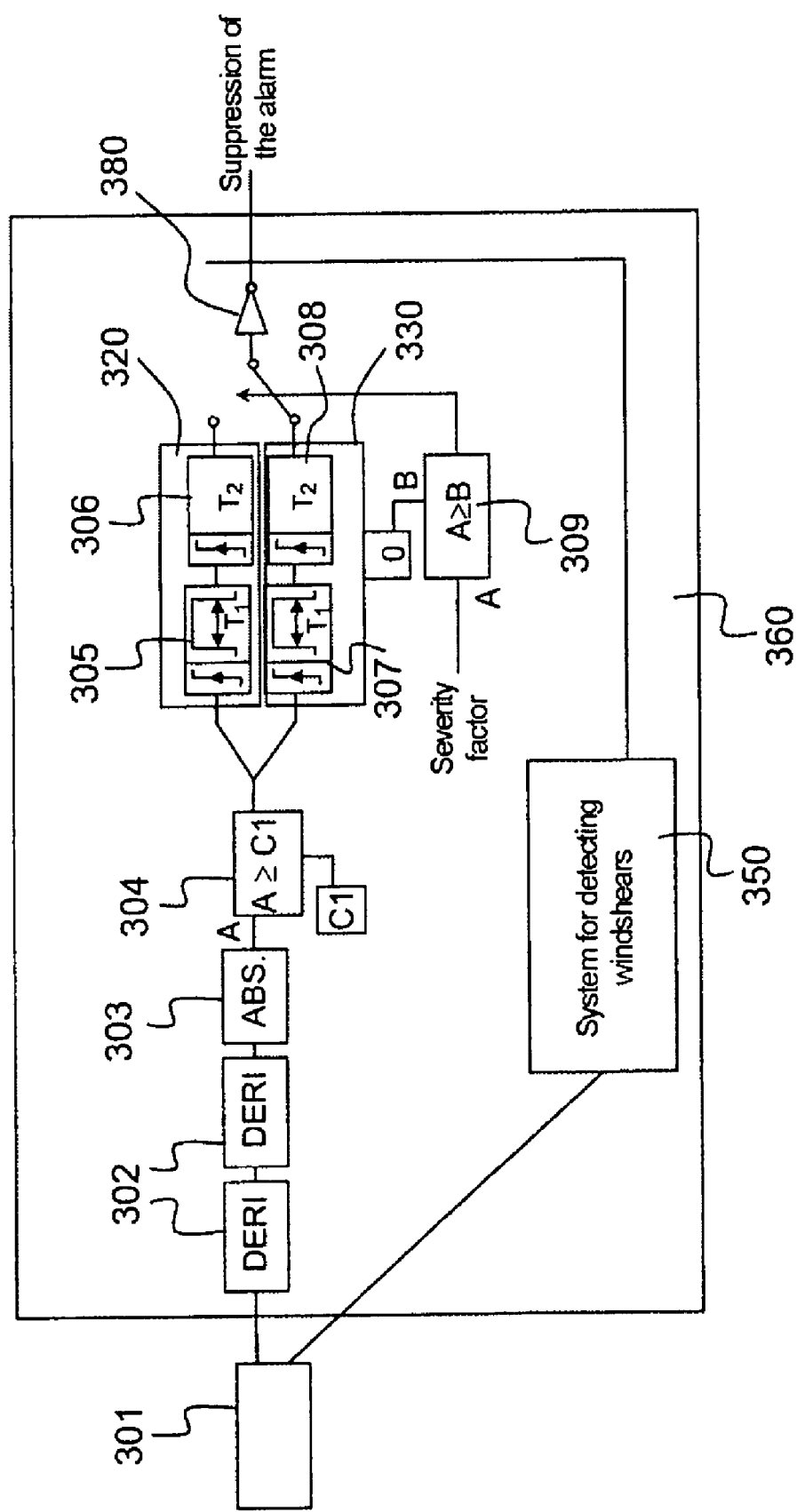
FIG. 3 represents a first exemplary implementation of the device according to the invention.
Figure 4:
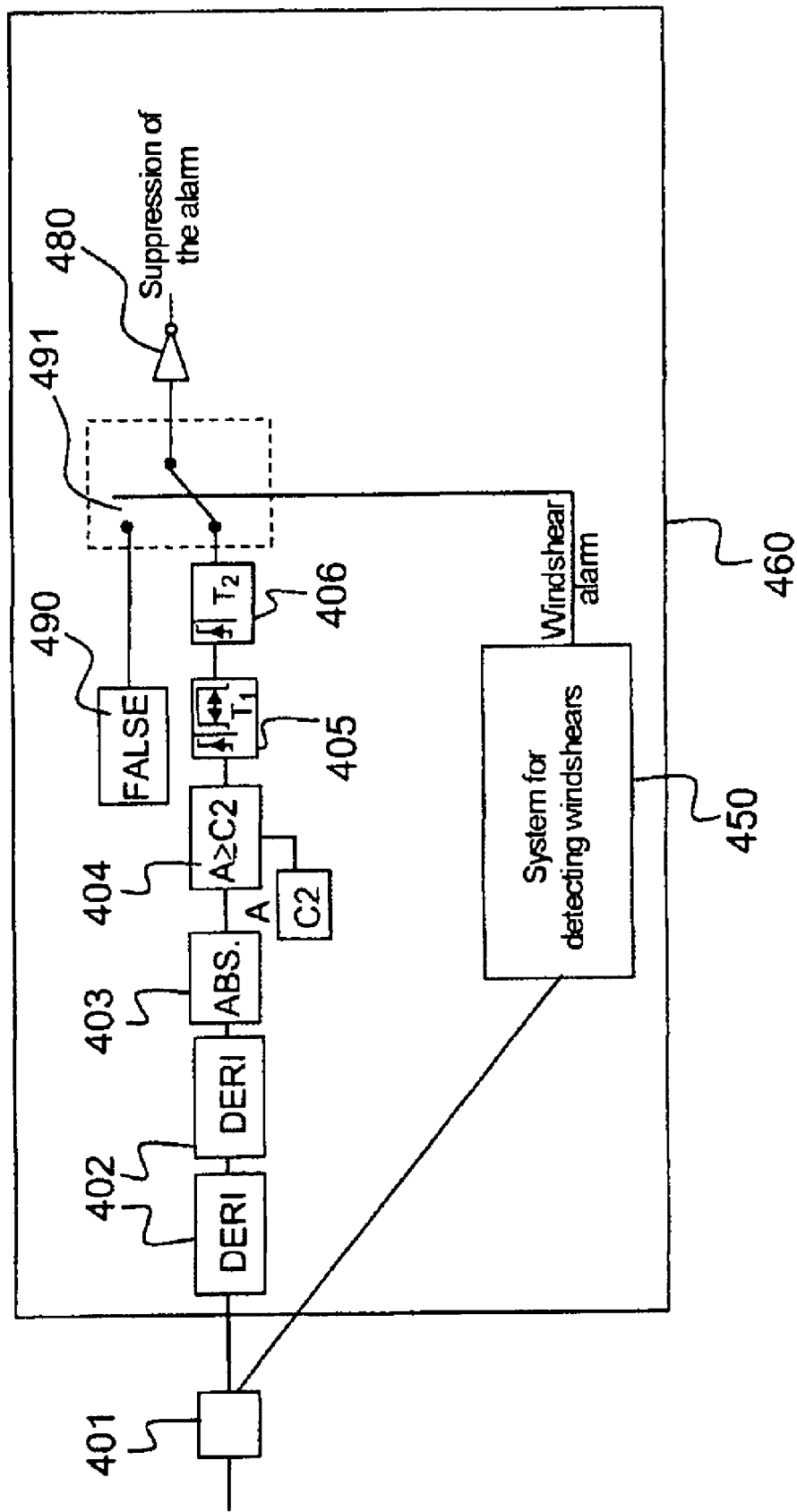
FIG. 4 represents a second exemplary implementation of the device according to the invention.

FIGS. 3 and 4 represent respectively a first and a second example of implementing the device according to the invention, The device for filtering alarms 360, 460 according to the invention comprises:
- means 302, 402 for the calculation of the second derivative of the flight parameter originating from the sensor 301, 401,
- means 304, 404 for the comparison of the term related to the second derivative of the flight parameter with a threshold C1,
- means for evaluating whether the term related to the absolute value of the second derivative of the flight parameter exceeds the threshold C1 over a duration greater than a time threshold T,
- means for suppressing the alarm originating from the windshear detection system 350, 450.

According to a variant of the invention, the device furthermore comprises means 303, 403 for the calculation of the absolute value of the second derivative of the flight parameter, the term related to the second derivative of the flight parameter being this absolute value.

In the first exemplary implementation of the device for filtering alarms according to the invention, the flight parameter is the angle of attack of the aircraft. The means for evaluating whether the absolute value of the second derivative of the flight parameter sporadically exceeds the threshold C1 comprise:
- a first pathway 320 comprising a first opening gate 305 linked to the comparison means 304 and able to suppress an alarm for a first duration $T_1$ and linked to a first confirmer 306 able to authorize an output of the alarm for a second duration $T_2$.
- a second pathway 330 comprising a second opening gate 307 linked to the comparison means 304 and able to suppress an alarm for the first duration $T_1$ and linked to a second confirmer 308 able to authorize an output of the alarm for the second duration $T_2$.
- means 309 for detecting a change of sign of the severity factor.

The two pathways 320, 330 are the same, while one is used, the other remains in a permanent initialization state, thereby making it possible to toggle to a virgin state when a change of sign of the severity factor occurs. When the aircraft encounters a windshear, it passes through a so-called "caution" zone before a so-called "warning" zone. If the output of an alarm is authorized before the suppression on the first pathway 320, then the output of the caution alarm can be permitted on the first pathway 320 but there is a risk of cutting off the warning alarm which follows directly behind. The tagging of the change of sign 309 and the toggling to the second pathway 330 which has remained in an initialized state makes it possible to solve this problem. The warning alarm is processed on the second pathway 330 and the first pathway 320 is reinitialized (the suppression is stopped).

The first variant of the device operates as described hereinafter. When the flight parameter is the angle of attack, the absolute value of this second derivative is then compared with the threshold value C1. The threshold value C1 is established so as to differentiate situations that generate false alarms. For example, it has been verified experimentally that when the associated second derivative of the filtered angle of attack exceeds the threshold C1, it is possible to detect certain turbulence and to avoid a false windshear alert based on turbulence and not on windshear. It is pointless suppressing the alert if the absolute value of the second derivative of the filtered angle of attack does not exceed the threshold C1.

In the case of severe windshear, a confirmer 306, 308 validates the relevance of the windshear alert by ensuring that the threshold is exceeded only sporadically: This element in fact authorizes output of the windshear alert for the second duration $T_2$ before the suppression. The first duration corresponding to the duration $T_1$ of suppression is defined by one of the two opening gates 305, 307.

In the case of severe turbulence that may induce a false alarm, the second duration $T_2$ of confirmation exists. The first duration $T_1$ is chosen in such a way that no alert can occur in the course of the latter. The suppression is reinitialized by the switch as soon as the severity factor changes sign. The first duration $T_1$ can be for example between 5 and 10 seconds, and the second duration $T_2$ for example 5 seconds.

In practice, it is possible to use, for example, a component termed "soft logic NOT" 380 for the suppression of the alarm. If there is suppression, the NOT transforms a 1 into 0 which goes to an AND gate and blocks the output of the alarm.

In the second exemplary implementation of the device for filtering alarms according to the invention, the flight parameter is the severity factor. The means for evaluating whether the absolute value of the second derivative of the flight parameter sporadically exceeds the threshold C1 comprise:
- an opening gate 405 linked to the comparison means 404 and able to suppress an alarm for a first duration $T_1$,
- a confirmer 406 able to authorize an output of the alarm for a second duration $T_2$ and linked to the opening gate 405.

The second variant of the device operates as described hereinafter. The severity factor undergoes a double differentiation. The absolute value of this second derivative is then compared with a threshold C2.

The threshold C2 is defined in the following manner: below the value C2, the aircraft is confronted either with a genuine windshear or with turbulence of low intensity not requiring any windshear alarm suppression. On the other hand, if the second derivative exceeds the threshold C2, the aircraft is confronted either with a severe windshear requiring an alarm to be output, or with turbulence requiring the suppression of the alert.

In the case of severe windshear, the confirmer 406 authorizes the output of the windshear alert for the second duration $T_2$ before the suppression. The first duration $T_1$ of the suppression is defined by the opening gate 405. If a windshear alert is generated outside of the conditions of suppression on the second derivative of the severity factor, the suppression is disabled for the duration of this windshear alert via the switch 491.

In the case of severe turbulence, the same second duration $T_2$ of confirmation exists. The first duration $T_1$ is chosen in such a way that no alert can occur in the course of the latter. As soon as severe turbulence is detected, the output of the windshear alert is suppressed for the first duration $T_1$ until the second derivative of the severity factor passes back below the threshold C2. A component 490 makes it possible to obtain suppression with a NOT component 480.

According to another variant of the device for filtering alarms according to the invention, the device furthermore comprises means for filtering an alarm corresponding to wind gusts.

Figure 5:
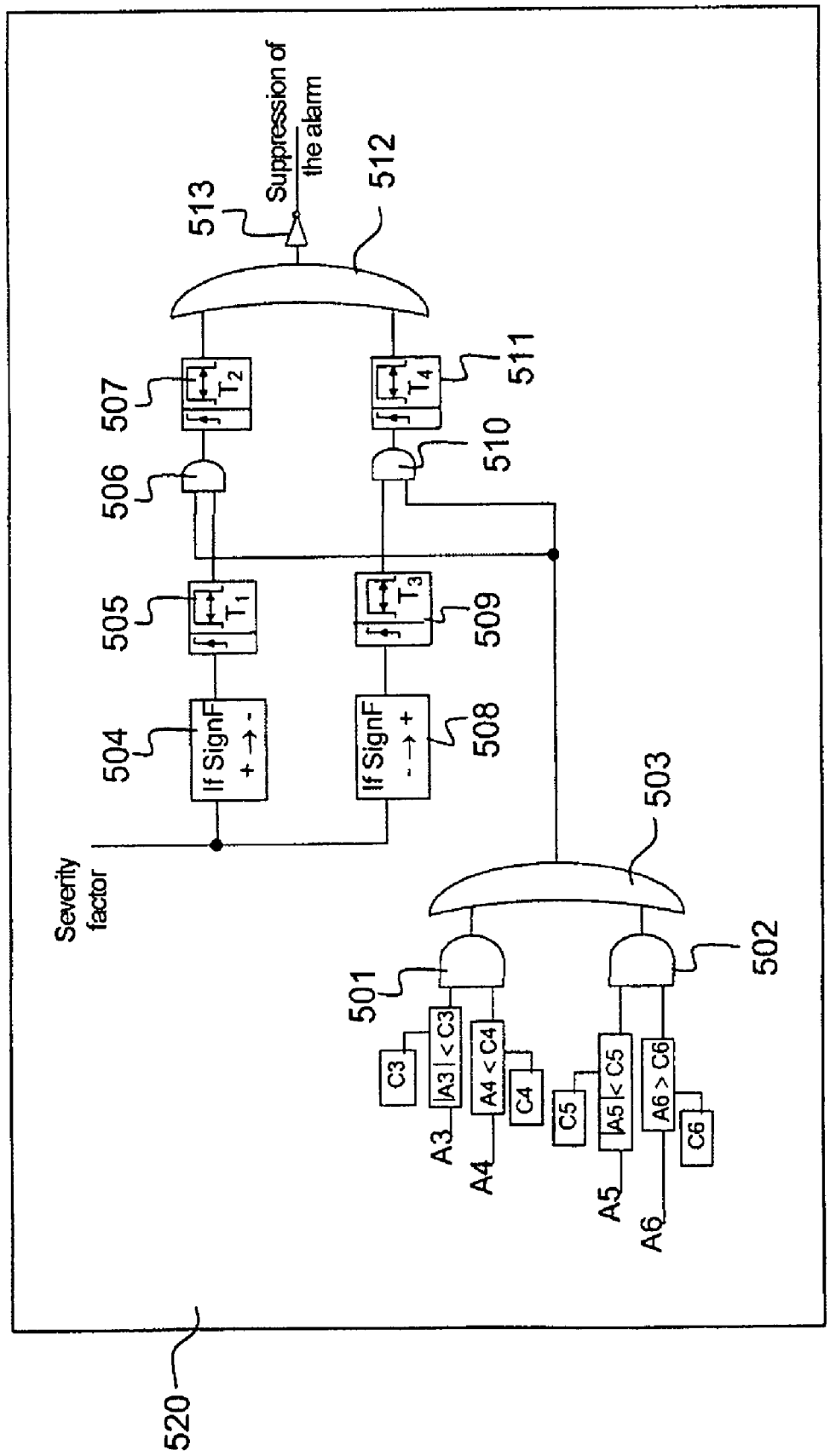
FIG. 5 represents an exemplary implementation of means for filtering signals corresponding to wind gusts.

FIG. 5 represents an exemplary implementation of the suppression means 520 for filtering an alarm corresponding to wind gusts. Such means 520 comprise a first AND gate 501 generating the value TRUE when the absolute value datum of the filtered vertical wind A3 (filtered wind drift angle) is less than a third threshold C3 and when the filtered horizontal acceleration datum A4 (filtered horizontal shear) is less than a fourth threshold C4 and generating the value FALSE otherwise. The means 520 furthermore comprise a second AND gate 502 generating the value TRUE when the absolute value datum of the filtered vertical wind A5 is less than a fifth threshold C5 and when the filtered horizontal acceleration datum A6 is greater than a sixth threshold C6 and generating the value FALSE otherwise. The means furthermore comprise a first OR gate 503 generating the value TRUE when the output of the first AND gate 501 or of the second AND gate 502 is TRUE, corresponding to the possible presence of a gust and generating the value FALSE otherwise. The threshold values C3, C4, C5 and C6 are determined experimentally and depend on the aircraft.

The means 520 furthermore comprise a first detector 504 generating the value TRUE upon a change of sign of the severity factor datum (indicating passage from a caution alert to a warning alert) and generating the value FALSE otherwise. The first detector 504 is linked to a first listening gate 505 gate generating the value TRUE for a first duration T1 when the first detector 504 has generated the value TRUE. A third AND gate 506 generates the value TRUE when the first listening gate 505 and the first OR gate 503 generate the value TRUE. A first suppression gate 507 is activated only when the third AND gate 506 generates the value TRUE.

The means 520 furthermore comprise a second detector 508 generating the value TRUE upon a change of sign of the severity factor datum and generating the value FALSE otherwise. The second detector 508 is linked to a second listening gate 509 gate generating the value TRUE for a first duration T3 when the second detector 508 has generated the value TRUE. A fourth AND gate 510 generates the value TRUE when the second listening gate 509 and the first OR gate 503 generate the value TRUE. A second suppression gate 511 is activated only when the fourth AND gate 510 generates the value TRUE.

A second OR gate 512 generates the value TRUE when at least one of the two suppression gates generates the value TRUE. The second OR gate generates the value false otherwise. When the second OR gate generates the value TRUE a windshear alert 513 is suppressed.

The means for filtering an alarm corresponding to wind gusts operate as described hereinafter. Comparators on the filtered horizontal acceleration datum (filtered horizontal shear) as well as on the filtered vertical wind datum (filtered wind drift angle) permit detection of the possible presence of a gust. When these data satisfy the values of the thresholds C3, C4, C5 and C6, the first OR gate generates a TRUE output. The threshold values are determined experimentally and depend on the aircraft. The presence of a real gust is substantiated only if this TRUE output appears in the course of one of the two time windows T1 and T3. These "listening" windows are created when the severity factor changes sign. If a gust occurrence condition is satisfied and at the same time a "listening" window is open, then a new window is generated whose role is to suppress the windshear alert.

The invention also relates to an item of equipment 360, 460 for detecting and filtering windshears comprising a system for detecting windshears. The item of equipment is embedded in an aircraft. The detection system is able to emit an alarm. The aircraft comprises at least one sensor allowing the acquisition of a flight parameter. The item of equipment comprises the device for filtering alarms according to the invention.

It will be readily seen by one of ordinary skill in the art that the present invention fulfils all of the objects set forth above. After reading the foregoing specification, one of ordinary skill in the art will be able to affect various changes, substitutions of equivalents and various aspects of the invention as broadly disclosed herein. It is therefore intended that the protection granted hereon be limited only by definition contained in the appended claims and equivalents thereof.

The invention claimed is:

1. A detection system for filtering alarms originating from a windshear detection system, embedded in an aircraft, the detection system being able to emit an alarm and the aircraft comprising at least one sensor allowing acquisition of an angle of attack, the detection system for filtering alarms comprising:
   means for calculation of a second derivative of the angle of attack,
   means for comparison of a term related to the second derivative of the angle of attack with a threshold C1,
   means for evaluating whether the term related to the second derivative of the angle of attack exceeds the threshold C1 over a duration greater than a time threshold T, which comprise:
   a first pathway comprising a first opening gate linked to the comparison means and able to suppress an alarm for a first duration $T_1$ and a first confirmer able to authorize an output of the alarm for a second duration $T_2$,
   a second pathway comprising a second opening gate linked to the comparison means and able to suppress the alarm for the first duration $T_1$ and a second confirmer able to authorize an output of the alarm for the second duration $T_2$, one of the two pathways being used while the other is in an initialization state,
   means for suppressing the alarm originating from the windshear detection system based on outputs of the first and second pathway.

2. The detection system for filtering alarms as claimed in claim 1, further comprising means for calculation of an absolute value of the second derivative of the angle of attack, the term related to the second derivative of the angle of attack being the absolute value.

3. The detection system for filtering alarms as claimed in claim 1, further comprising means for filtering signals corresponding to wind gusts.

4. The detection system for filtering alarms as claimed in claim 3, wherein the means for filtering signals corresponding to wind gusts comprise:
   a first AND gate generating a value TRUE when an absolute value datum of a filtered vertical wind A3 is less than a third threshold C3 and when a filtered horizontal acceleration datum A4 is less than a fourth threshold C4 and generating a value FALSE otherwise;
   a second AND gate generating the value TRUE when an absolute value datum of the filtered vertical wind A5 is less than a fifth threshold C5 and when a filtered horizontal acceleration datum A6 is greater than a sixth threshold C6 and generating the value FALSE otherwise;
   a first OR gate generating the value TRUE when an output of the first AND gate or of the second AND gate is TRUE, corresponding to a possible presence of a gust and generating the value FALSE otherwise;
   a first detector generating the value TRUE upon a change of sign of a severity factor datum and generating the value FALSE otherwise;
   a first listening gate being linked to the first detector and generating the value TRUE for a first duration T1 when the first detector has generated the value TRUE and generating the value FALSE otherwise;

a third AND gate generating the value TRUE when the first listening gate and the first OR gate generate the value TRUE;

a first suppression gate being activated only when the third AND gate generates the value TRUE;

a second detector generating the value TRUE upon a change of sign of the severity factor datum and generating the value FALSE otherwise;

a second listening gate being linked to the second detector and generating the value TRUE for a first duration T3 when the second detector generates the value TRUE and generating the value FALSE;

a fourth AND gate generating the value TRUE when the second listening gate and the first OR gate generate the value TRUE;

a second suppression gate being activated only when the fourth AND gate generates the value TRUE;

a second OR gate generating the value TRUE when at least one of the two suppression gates generates the value TRUE and generating the value false otherwise, an alarm being suppressed when the second OR gate generates the value TRUE.

5. An item of equipment for detecting windshears comprising a system for detecting windshears, the item of equipment being embedded in an aircraft, the detection system being able to emit an alarm, the aircraft comprising at least one sensor for an acquisition of a flight parameter, the item of equipment comprising the detection system for filtering alarms as claimed in claim 1.

6. The detection system for filtering alarms as claimed in claim 2, further comprising means for filtering signals corresponding to wind gusts.

7. An item of equipment for detecting windshears comprising a system for detecting windshears, the item of equipment being embedded in an aircraft, the detection system being able to emit an alarm, the aircraft comprising at least one sensor for the acquisition of a flight parameter, the item of equipment comprising the detection system for filtering alarms as claimed in claim 2.

8. An item of equipment for detecting windshears comprising a system for detecting windshears, the item of equipment being embedded in an aircraft, the detection system being able to emit an alarm, the aircraft comprising at least one sensor for an acquisition of a flight parameter, the item of equipment comprising the detection system for filtering alarms as claimed in claim 3.

9. An item of equipment for detecting windshears comprising a system for detecting windshears, the item of equipment being embedded in an aircraft, the detection system being able to emit an alarm, the aircraft comprising at least one sensor for the acquisition of a flight parameter, the item of equipment comprising the detection system for filtering alarms as claimed in claim 4.

* * * * *